Jan. 27, 1970  J. W. PATTON ET AL  3,491,890
DOUBLE PASS, SINGLE ELEMENT STRAINING APPARATUS
Filed Aug 23, 1967
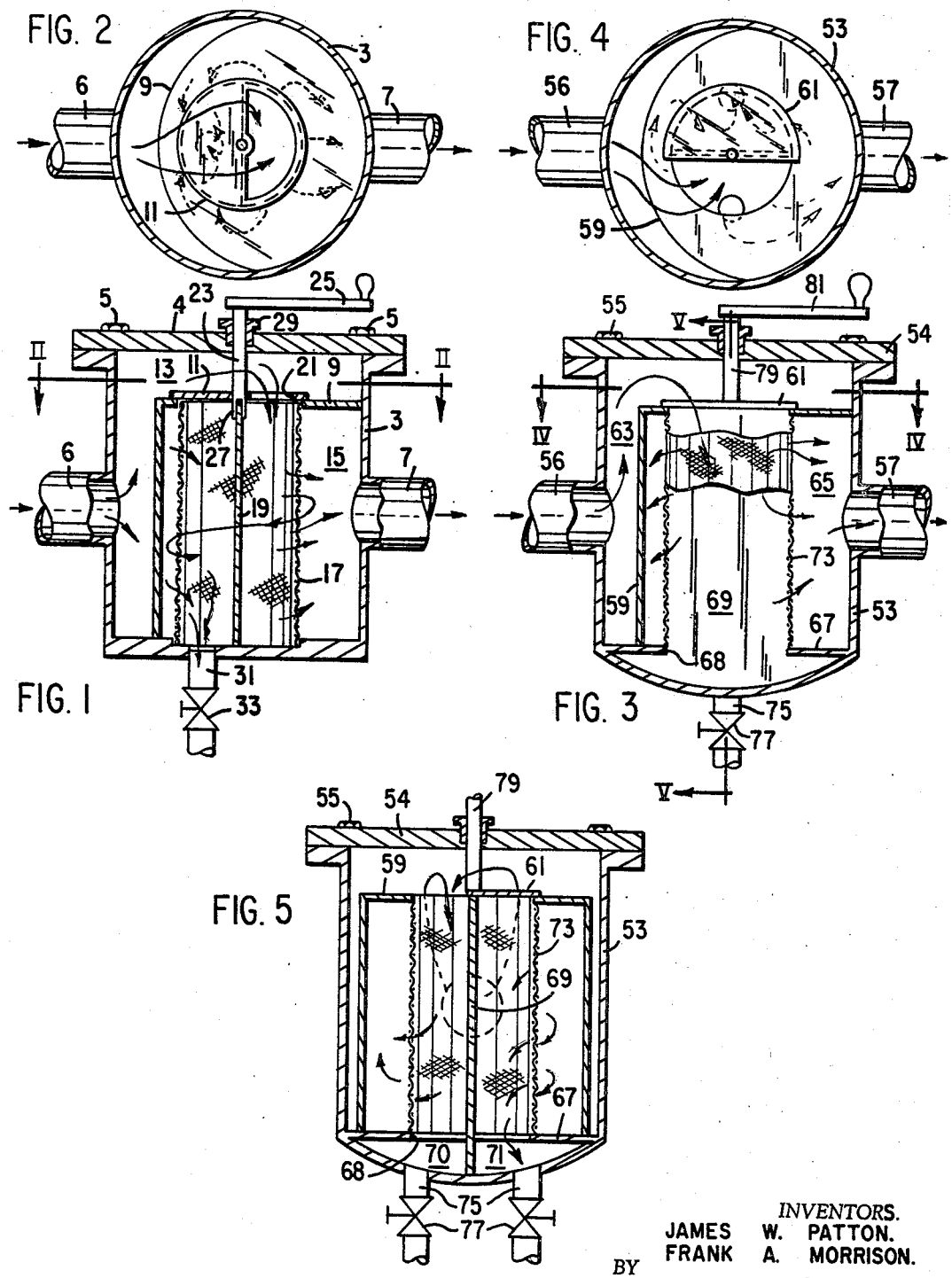
INVENTORS.
JAMES W. PATTON.
FRANK A. MORRISON.
BY James E. Schardt
ATTORNEY.

United States Patent Office 3,491,890
Patented Jan. 27, 1970

3,491,890
DOUBLE PASS, SINGLE ELEMENT STRAINING APPARATUS
James W. Patton, Jeannette, and Frank A. Morrison, Greensburg, Pa., assignors to Carrier Corporation, Syracuse, N.Y., a corporation of Delaware
Filed Aug. 23, 1967, Ser. No. 662,782
Int. Cl. B01d 35/28, 35/16
U.S. Cl. 210—427                      3 Claims

ABSTRACT OF THE DISCLOSURE

A straining apparatus for trapping particulate matter in a fluid stream, the apparatus having a divided strainer basket there adapted for straining fluid through one section thereof, while the second section is back-flushed to clean the collected particles therefrom.

BACKGROUND OF THE INVENTION

In many applications of fluid straining apparatus, it is desirable to maintain a steady flow of strained or filtered fluid even when the filter must be cleaned or back-flushed. For this reason, it is common to employ two strainer baskets and associated casings so that the fluid can be diverted through one of the baskets while the other is being cleaned. An arrangement of this type necessarily involves two filters or baskets, a double casing or two single casings, a quantity of piping and numerous valves to divert the water from one strainer basket to the other.

SUMMARY OF THE INVENTION

This invention relates to a straining apparatus having a single, partitioned basket therein with means for selectively passing the fluid being filtered through one side or the other of the basket to allow the nonfunctioning side of the basket to be back-flushed by a portion of the filtered fluid while the other side provides filtration of the fluid passing through the straining apparatus.

BRIEF DESCRIPTION OF THE DRAWINGS

FIGURE 1 is a front elevation view in section of a first embodiment of my invention;
FIGURE 2 is a top sectional view taken along line II—II of FIGURE 1;
FIGURE 3 is a front elevational view in section of a second embodiment of my invention;
FIGURE 4 is a top sectional view taken along line IV—IV of FIGURE 3; and
FIGURE 5 is a side elevational view in section of the second embodiment of my invention.

DESCRIPTION OF THE PREFERRED EMBODIMENTS

Referring to FIGURES 1 and 2, there is illustrated a fluid straining apparatus including a casing 3 having an inlet 6 and an outlet 7 formed therein for passage of fluid therethrough. A top plate 4 is provided for attachment to casing 3 as by bolts 5. A partition 9 in casing 3 having a removable cover plate 11 is provided to divide the interior of the casing into an inlet chamber 13 communicating with inlet 6 and a filtering chamber 15 communicating with outlet 7. A filter basket 17, constructed of a perforate material, such as wire screening, and preferably formed in the shape of a cylinder open at both ends, has an imperforate partition 19 affixed thereto. The basket is rotatably mounted in filtering chamber 15.

A passageway 21 in cover plate 11 provides an opening for flow of unfiltered fluid from inlet chamber 13 to the interior of one-half of filter basket 17. The fluid from basket 17 flows through the walls of the basket into chamber 15 surrounding the basket and through outlet 7.

A shaft 23 having a crank handle 25 is journaled for rotation in top plate 4. The shaft is provided with a bifurcated end 27 for engagement with partition 19 of basket 17 so that movement of handle 25 will effect rotation of the basket.

A seal 29 on top plate 4 prevents fluid leakage from chamber 13 along shaft 23.

When the half of the basket in communication with passageway 21 becomes clogged or fouled with material removed from the fluid flowing therethrough, the basket can be rotated 180° to put the clean half of basket 17 in communication with passageway 21.

To facilitate cleaning of the fouled half of the basket without dismantling the strainer apparatus, a drain line 31 having a valve 33 therein is provided in casing 3 communicating with the inoperative half of the strainer basket. By momentarily opening valve 33, a portion of the filtered fluid from chamber 15 will flow toward the interior of the fouled section of the basket, thereby flushing the collected particles therein out of line 31. Thus, one half of the basket may be flushed clean while the other section of the basket is filtering the fluid through the straining apparatus.

The second embodiment of my invention utilizes the same principle of operation as the first embodiment.

Referring to FIGURES 3, 4 and 5, there is illustrated a fluid straining apparatus having a casing 53 and a top plate 54 adapted for attachment to casing 53, as by bolts 55. An inlet 56 and an outlet 57 are provided in casing 53 for passage of fluid therethrough. A partition 59 having a rotatable half cover plate 61 is provided in casing 53 to divide the interior of the casing into an inlet chamber 63 communicating with inlet 56 and a filtering chamber 65 communicating with outlet 67. The filter chamber is provided wih a base plate 67 having a passageway 68 therein. A fixed partition 69 extending from cover plate 61 through the passageway in base plate 67 to the bottom of casing 53 provides flushing chamber 70 and 71 beneath base plate 67. A cylindrical strainer basket 73 is provided in filter chamber 65, partition 69 acting as a divider therefor to create a two sectioned basket, one section of which communicates with flushing chamber 70 while the other section communicates with flushing chamber 71. Flushing chambers 70 and 71 are provided with discharge lines 75 having normally closed valves 77 thereon.

A rotatable shaft 79 having a handle 81 associated therewith is attached to cover plate 61 so that rotation of the handle will move plate 61 so as to selectively cover one section of the strainer basket.

As illustrated by the flow arrows, it can be seen that the fluid flow path in the casing is through inlet chamber 63, into the uncovered section of the strainer basket, out the side walls of the basket into filtering chamber 65 and through outlet 57. When the basket section in use becomes dirty, handle 81 may be turned to cover the dirty basket section and uncover the clean section to provide flow through the clean basket section. By momentarily opening the valve 77 associated with the flushing chamber in communication with the nonoperational, dirty section of the basket, fluid will flow from filtering chamber 65 through the dirty basket section to flush the collected particles out the line 75 associated therewith.

From the foregoing, it can be seen that both embodiments of my invention provide a straining apparatus which utilizes a portion of the strainer basket for filtering fluid while simultaneously providing means for flushing the collected particles in the other portion. While the embodiments described and illustrated disclose a single basket partition dividing the basket into sections of equal volume and filtering surface, the strainer basket could be partitioned into two sections of unequal volume or a larger number of sections if desired.

While we have described the preferred embodiments of our invention, it is to be understood that the invention is not limited thereto but may be otherwise embodied within the scope of the following claims.

We claim:

1. A fluid straining apparatus for removing particulate matter from a fluid stream comprising a casing having an inlet and an outlet for the passage of fluid therethrough,
    a strainer basket disposed in said casing,
    imperforate partition means associated with said basket to provide a first and second section therein,
    rotatable cover means associated with said basket to selectively cover one section of said strainer basket in a first position and the other section of said basket in a second position for selectively communicating the casing inlet with one section of said strainer basket to direct incoming fluid into the interior of said basket for passage outwardly therefrom,
    first drain means associated with the first section of said basket, and
    second drain means associated with the second section of said basket, opening of the drain means associated with the basket section not in communication with the inlet of said casing allowing strained fluid to pass inwardly into the basket section and out said drain means for washing particulate matter from the interior thereof.

2. A fluid straining apparatus according to claim 1 wherein said casing further includes a partition dividing said casing into a fluid inlet chamber and a filtration chamber, said strainer basket being disposed in said filtration chamber, said partition having an opening therein to provide communication between said inlet chamber and said strainer basket, said rotatable cover means being associated with the opening in said casing partition and being adapted to prevent passage of fluid from the inlet chamber to one section of said basket while providing communication between the inlet chamber and the other section of said basket, and
    means for aligning the cover means for passage of fluid through either section of said strainer basket.

3. A fluid straining apparatus according to claim 2 wherein said means for aligning the cover means with either section of said strainer basket includes a shaft rotatably mounted in said casing and operatively associated with said cover means, rotation of said shaft causing rotation of said cover for alignment thereof with the desired section of said strainer basket.

References Cited

UNITED STATES PATENTS

| | | | |
|---|---|---|---|
| 18,031 | 8/1857 | Ayres | 210—426 |
| 137,653 | 4/1873 | Brown et al. | 210—427 |
| 242,495 | 6/1881 | Wells | 210—426 |
| 2,007,780 | 7/1935 | Wardle | 210—427 X |

REUBEN FRIEDMAN, Primary Examiner

J. W. ADEE, Assistant Examiner